March 1, 1955  F. G. HODSDON  2,703,068
FLUSHING ARRANGEMENT FOR PIPE LINE MILKING SYSTEM
Filed April 12, 1952  2 Sheets-Sheet 2
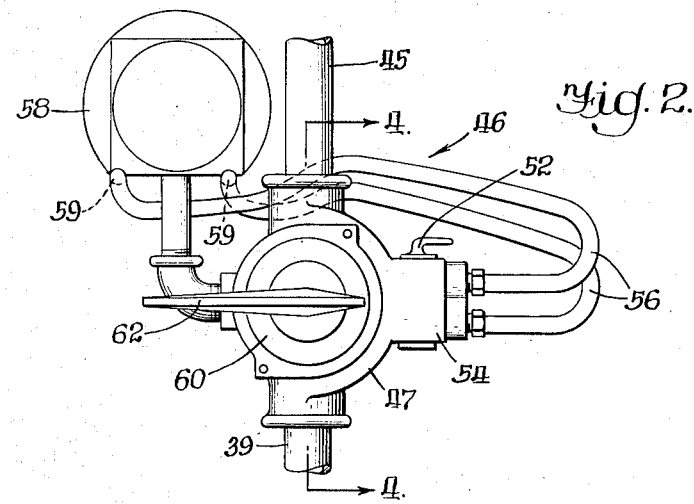
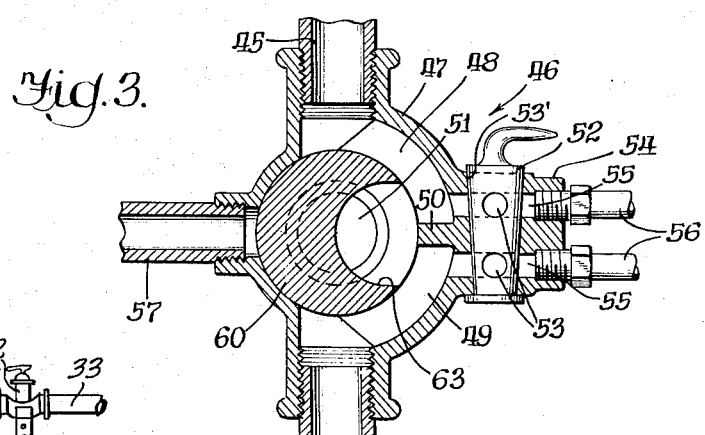
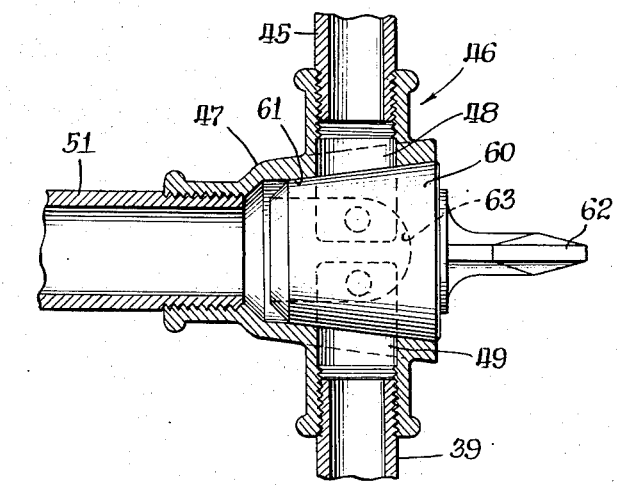
INVENTOR.
Floyd G. Hodsdon
BY Paul O. Pippel
Atty.

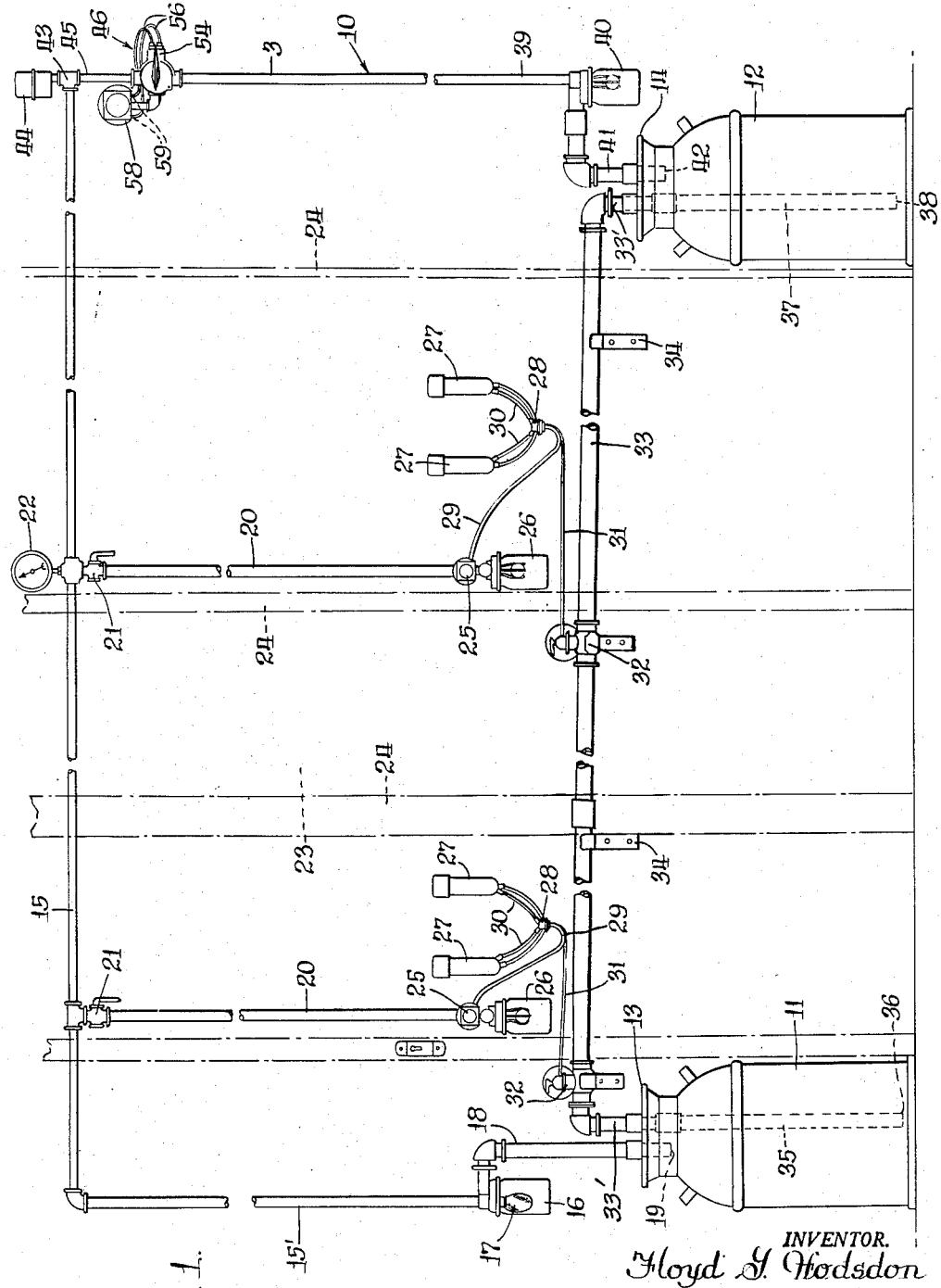

United States Patent Office 2,703,068
Patented Mar. 1, 1955

2,703,068

FLUSHING ARRANGEMENT FOR PIPE LINE MILKING SYSTEM

Floyd G. Hodsdon, La Grange, Ill., assignor to International Harvester Company, a corporation of New Jersey Application April 12, 1952, Serial No. 281,960

8 Claims. (Cl. 119—14.18)

This invention relates to an improvement in a pipe-line milking system. More particularly this invention relates to an improved arrangement for flushing the conduits of a pipe-line milking system.

It is a prime object of this invention to provide an improved pipe-line milking system, the system including an effective flushing arrangement which is operable after the milking operation to thoroughly cleanse and flush the milk pipe of the system.

Still another object is to provide a flushing arrangement for pipe-line milking systems, the arrangement including a pulsating device which is effective to alternately place vacuum and atmosphere on opposite ends of a milk pipe for the purpose of drawing a flushing solution from one end of the inlet pipe to the other thereby effectively flushing the interior of the pipe.

Still another object is to provide a pipeline milking system wherein the milk pipe is connected to a pair of spaced containers or empty milk receivers, each of the containers having a vacuum connection which is in turn connected to a pulsating device, the pulsating device being effective to alternately place the containers under vacuum and atmosphere whereby a washing solution is drawn from one container to the other through the milk inlet pipe whereupon the milk inlet pipe is effectively flushed and cleansed after the milking operation.

A still further object is to provide a pipe-line milking system, the system comprising a vacuum line which is suitably connected to a first temporary flush water receiver, the vacuum line being connected at one end to a pulsating device, the pulsating device also being connected to a vacuum conduit which is in communication with a second receiver, the receivers being connected by a milk pipe, the pulsator being arranged to alternately connect the vacuum line and the vacuum conduit with vacuum and atmosphere whereby the receivers are also alternately placed under vacuum and atmosphere, the effect being to cause the washing liquid within one receiver to surge and travel through the milk inlet pipe to the other receiver thereby effectively cleansing the milk inlet pipe.

A still further and more specific object is to provide a pipe-line milking system having a vacuum line connected to a first receiver, the vacuum line in turn being connected to a flushing liquid control unit which in turn is connected to a vacuum conduit in communication with a second receiver, the receivers being connected for communication with each other by means of a milk pipe, the flushing control valve being connected to a source of vacuum and having a conduit connection to which a pulsator is connected, the flushing control unit including a valve member which is operable to connect the vacuum conduit and the vacuum line in a manner wherein the vacuum and atmosphere are alternately provided in the first and second receivers and whereby a flushing solution within the receivers is alternately removed from one receiver through the milk line to the other receiver, the valve member being adapted to shut off communication between the pulsator and the vacuum line and pipeline and to connect the vacuum line and vacuum conduit with the source of vacuum for the purpose of operating the pipeline system in a conventional milking operation.

These and further objects will become more readily apparent from a reading of the specification when examined in connection with the accompanying sheets of drawings.

In the drawings:

Figure 1 is an elevational view of an improved pipe-line milking and flushing system including the novel vacuum and atmosphere control mechanism for flushing the milk inlet pipe of the system;

Figure 2 is an enlarged front elevational view of a vacuum and atmosphere flushing control unit or valve having a pulsating mechanism connected thereto;

Figure 3 is a cross-sectional view through the control unit and valve shown in Figure 2;

Figure 4 is a cross-sectional view through the vacuum control unit the view being taken substantially along the line 4—4 of Figure 2; and, Figure 5 is a fragmentary elevational view of a portion of a pipe-line milking system.

Referring now to Figure 1, a pipe-line milker flushing arrangement is generally designated by the reference character 10. The pipe-line milker flushing arrangement includes a temporary flushing container or receiver 11 and a milk can or milk receiver 12, the receivers 11 and 12 being suitably spaced one at each end of the milk line as indicated. The receivers 11 and 12 respectively include covers 13 and 14 which may be of a conventional type for the purpose of effectively sealing the interior of the receivers. A vacuum line 15 extends in a horizontal direction, the line 15 including a vertical section 15' which is suitably connected to a trap 16. The trap 16 may consist of a conventional glass jar in which a strainer or air filter 17 is positioned. The trap 16 is connected to a conduit 18, the conduit 18 extending downwardly into the receiver 11 and terminating within the receiver 11 as indicated by the reference character 19.

In the arrangement shown in Figure 1 the system is set up for the flushing operation in that the conduit 18 is connected to the temporary receiver 11 which is only used during the flushing operation. When the arrangement is used as a conventional milker, as indicated in the fragmentary view of Figure 5, the receiver 11 is removed and the conduit 18, by means of a U-connection 18', is connected directly to a milk inlet line which is further described in the following description as being connected to the receiver 12. As indicated in Figure 5, the milk inlet line in the milking operation is inclined slightly toward the receiver 12.

The vacuum line 15 is in communication with a plurality of riser pipes 20, the pipes 20 being suitably connected to the vacuum line 15 by means of shutoff cocks 21. One of the riser pipes 20, as indicated in Figure 1, is also in communication with a conventional vacuum gauge 22. The piping structure shown in the present pipe-line milking arrangement 10 is suitably supported on a building wall 23 which, as shown schematically, may also include a number of uprights 24 to which parts of the system are connected and supported.

Each of the riser pipes 20 is also suitably connected to a conventional type of pulsator 25 the pulsator in turn being connected to a trap 26. The type of pulsator which may be utilized is well shown in applicant's Patent 1,844,853 entitled Pulsator For Milking Machines and patented February 9, 1932. The pulsator in this patent is provided with suitable slide valves and mechanism which in response to vacuum provides for alternate vacuum and atmosphere in the air conduits going to a conventional teat cup cluster. The pulsator 25 shown for each of the riser pipes 20 is connected to teat cups 27 by means of a milker claw 28. An air conduit 29 is connected to each of the pulsators 25 the air conduit 29 being suitably connected to the milker claw 28 of each cluster. Flexible air conduits 30 extend from the milker claw 28 to the teat cups 27. Each milker claw 28 is provided with a flexible milk conduit 31 which is connected to a milk cock 32 positioned on a milk inlet or milk receiving conduit 33.

The milk conduit 33 may be suitably connected to the wall 23 by means of brackets 34. One end of the milk inlet line 33 is in communication, by means of a short section of conduit or pipe 33', with a conduit connection 35 which extends downwardly into the container or receiver 11. The conduit connection 35 terminates adjacent the bottom of the receiver 11 as indicated at 36. The other end of the milk inlet line 33 is in communication, by means of a short section of conduit or pipe 33', with a conduit connection 37 which extends downwardly into the milk receiver 12 and terminates adjacent the bottom of said milk receiver as indicated at 38.

A vertically extending vacuum conduit is indicated at 39. The vacuum conduit 39 is connected to a trap 40 which in turn is connected to a conduit 41 communicating with the interior of the milk receiver 12 as indicated at 42. The vacuum line 15 is provided at one end with a T-fitting 43 to which a vacuum regulator 44 is connected. The vacuum regulator 44 can be of a conventional design for maintaining a certain vacuum pressure within the system. The other end of the T-fitting 43 is connected to a conduit section 45 which in turn communicates with a control unit or valve 46, the valve 46 being effective to regulate the distribution of vacuum and atmosphere to the system as will be indicated in the operation.

The valve 46 includes a casing 47 which as best indicated in Figures 2, 3 and 4 is provided with chambers 48 and 49 which are suitably separated by means of a partition 50. The chambers 48 and 49 are adapted to be placed into communication with a vacuum source conduit or connection 51 which leads to a vacuum pump or suitable source of vacuum not shown. A valve member 52 is supported on the casing 47, the valve member 47 having a pair of parallel bores 53. The valve member 52 is rotatable in a conical bore 53' formed in a projection 54 extending laterally outwardly from the casing 47. The projection 54 further includes parallel bores or passages 55 which are positioned so that they may be placed into registry with the bores 53 during a certain position of the valve member 52. Conduits 56 are in communication with the bores 55 the conduits 56 being adapted to place the chambers 48 and 49 alternately under vacuum and atmosphere.

As best shown in Figures 2 and 3 a pulsator connecting conduit 57 extends outwardly from the casing 47, the conduit 57 supporting a pulsating unit 58. The pulsating unit 58 utilized in the present arrangement may be of similar construction as the pulsator disclosed in applicant's aforementioned patent, Number 1,844,853. It is not deemed necessary to describe the pulsating device in detail since the operation is adequately disclosed in the above mentioned patent. A pulsator of this type includes alternate vacuum and atmosphere connections 59, each of the connections 59 being suitably connected to one of the conduits 56. A frusto-conical valve member 60 is mounted for rotation in a frusto-conical bore 61 provided in the valve casing 47. The valve member 60 includes a handle 62 and is provided with a recess 63 which as indicated in Figure 3 is operable during a certain position of the valve member 60 to place the chambers 48 and 49 in communication.

In the milking operation the conduit 18 is disconnected from the temporary flushing receiver 11, and the conduit 18 is directly connected to the milk line 33, by means of the U-connection 18'. The valve member 60 is now positioned as indicated in Figure 3. In this position the valve member 60 blocks the conduit 57 from communication with the vacuum conduit 51. The chambers 48 and 49 are in communication with each other and the valve member 52 is closed with respect to the conduits 56. The conduit 45 and vacuum line 15 are now under a vacuum and upon the opening of the shutoff cocks 21 the pulsators 25 are placed under vacuum causing operation of the teat cups 27 in a conventional manner. The vacuum conduit 39 also is under vacuum thus placing the milk receiver 12 under vacuum, this vacuum also being present in the milk inlet line or conduit 33. Milk from the animal flows to the conduit 33 from the flexible conduits 31 in the conventional manner and milk enters into the receiver 12. After the receiver 12 has been filled it is removed and replacement receivers 11 and 12 may be placed into the position indicated in Figure 1 whereupon the washing operation may take place. It must of course be understood that in the milking operation a plurality of milk receivers 12 may be utilized and that the temporary receiver 11 and the milk receiver 12 which are used in the washing operation may be of similar construction such as milk cans.

One of the receivers is filled with a washing solution and the system is now ready for washing. During the washing process the shutoff cocks 21 are placed in a closed position and the valve member 60 is turned a full 180 degrees so that the chambers 48 and 49 are no longer in communication and the recess 63 is directly in communication with the connection 57 and the vacuum conduit 51. The pulsator 58 now is under vacuum and the valve member 52 is turned so that the ports or bores 53 are in registry with the bores 55.

As indicated above the pulsator 58 is effective to alternately place the conduits 56 under vacuum and atmosphere. Thus as one of the conduits 56 is placed under vacuum the other conduit is open to the atmosphere. Supposing now that the chamber 49 is placed under vacuum, the vacuum of course is transmitted to the conduit 39 and to the milk receiver 12 whereby the washing liquid which is present in receiver 11 is drawn upwardly through the pipe 35 to the milk conduit 33 and the washing liquid surges and courses through this conduit into the milk receiver 12 thereby effectively cleansing the conduit 33. During the next stroke of the pulsator the chamber 49 is open to the atmosphere and the vacuum within the milk receiver 12 is destroyed. On the other hand the chamber 48 is now closed to the atmosphere and has a vacuum therein, this vacuum pressure also being present in the conduit 45, the vacuum line 15, and in the container 11. Since the vacuum is now present in the container 11 the washing liquid in receiver 12 flows through the conduit 33 back into the receiver 11 and thus a complete washing cycle has been completed. Thus it can be seen that upon each stroke of the pulsator, washing liquid is flushed from one receiving container to the other, this process being repeated a number of times until effective and complete washing and sterilization of the pipeline 33 is effected.

In the type of pulsator described in applicant's patent the stroke and action may be quite rapid and for the flushing operation it is apparent that a slower acting pulsator is desired. The type of pulsating unit 58 indicated here is suitably regulated so that the stroke from vacuum to atmosphere and vice versa takes a considerable time so that all of the liquid in one receiver can be transferred to the other receiver before the stroke of the pulsator changes. This regulation may be effected by means of using larger diaphragm chambers within the pulsator or by suitable regulating valves or mechanism which may be inherently a part of the pulsator. It is not felt necessary to go into the construction of the pulsator in a more elaborate manner since pulsating units of this type are well known in the art and their regulation is merely a conventional operation.

It can now be seen that an effective pipe-line milking arrangement and mechanism for washing the conduits has been described. It must be realized that a milk line of the type shown may extend from one end of a milking establishment to the other and may have as many as six or more milking machines connected to it for delivering milk to the milk line 33. As previously indicated a number of milk receivers may be connected in series for filling purposes this being merely a matter of connecting the cans. By the novel arrangement disclosed a milk line of considerable length may be properly and effectively washed after the milking operation has been completed.

It can now be seen that the objects of the invention have been fully achieved and it must be understood that changes and modifications may be made which do not depart from the spirit of the invention as disclosed nor the scope thereof as defined in the appended claims.

What is claimed is:

1. In combination, a pipe-line milking system comprising a vacuum line, a pulsator connecting line connected to said vacuum line, a first valve in said pulsator connecting line operable to shut off communication between said vacuum line and said pulsator line, a first receiver, means connecting said first receiver to one end of said vacuum line for communication therewith, a second receiver, a milk receiving conduit connected to said receivers for communication therewith, a conduit connection within each receiver, each conduit connection extending adjacent to the bottom of each receiver, pipe means connecting the conduit connections and said receiving conduit, a vacuum conduit communicating with said second receiver, a flushing control unit including a second valve having first and second valve chambers, first conduit means connecting said first chamber with said vacuum conduit, second conduit means connecting said second chamber with said vacuum line, a pulsator connection connected to said second valve, a pulsator connected to said pulsator connection, alternate vacuum and atmosphere connections on said pulsator, a first vacuum and atmosphere conduit connected to one of said vacuum and atmosphere connections and being in communication with said first chamber, a second vacuum and atmosphere conduit in communication with the other vacuum and atmosphere connection and being connected to and in communication with said second chamber, a vacuum source connection on said second valve adapted to connect said first and second chambers with a source of vacuum, a movable valve member in said second valve movable to a first position to provide for communication between said first and second chambers and said vacuum source connection and to block communication to said pulsator connection, said valve being movable to a second position to block communication between said chambers and to connect said pulsator connection to the vacuum source connection, and a third valve means movable to block communication between said first and second vacuum and atmosphere conduits and said chambers.

2. In combination, a pipe-line milking system comprising a vacuum line, a pulsator connecting line connected to said vacuum line, a first valve in said pulsator connecting line operable to shut off communication between said vacuum line and said pulsator line, a first receiver, means connecting said first receiver to one end of said vacuum line for communication therewith, a second receiver, a milk receiving conduit connected to said receivers for communication therewith, a milk inlet connection on said milk receiving conduit, a conduit connection within each receiver, each conduit connection extending adjacent to the bottom of each receiver, pipe means connecting the conduit connections and said receiving conduit, a vacuum conduit communicating with said second receiver, a flushing control unit including a second valve having first and second valve chambers, first conduit means connecting said first chamber with said vacuum conduit, second conduit means connecting said second chamber with said vacuum line, a pulsator connection connected to said valve, a pulsator connected to said pulsator connection, alternate vacuum and atmosphere connections on said pulsator, a first vacuum and atmosphere conduit connected to one of said vacuum and atmosphere connections and being in communication with said first chambers, a second vacuum and atmosphere conduit in communication with the other vacuum and atmosphere connection and being connected to and in communication with said second chamber, a vacuum source connection on said second valve adapted to connect said first and second chambers with a source of vacuum, a movable valve member in said second valve movable to a first position to provide for communication between said first and second chambers and said vacuum source connection and to block communication to said pulsator connection, said valve being movable to a second position to block communication between said chambers and to connect said pulsator connection to the vacuum source connection, and a third valve means movable to block communication between said first and second vacuum and atmosphere conduits and said chambers.

3. In combination, a pipe-line milking system comprising a vacuum line, a pulsator connecting line connected to said vacuum line, a first receiver, means connecting said first receiver to one end of said vacuum line for communication therewith, a second receiver, a milk receiving conduit connected to said receivers for communication therewith, a conduit connection within each receiver, each conduit connection extending adjacent to the bottom of each receiver, pipe means connecting the conduit connections and said receiving conduit, a vacuum conduit communicating with said second receiver, a flushing control unit including a valve having first and second valve chambers, first conduit means connecting said first chamber with said vacuum conduit, second conduit means connecting said second chambers with said vacuum line, a pulsator connection connected to said valve, a pulsator connected to said pulsator connection, alternate vacuum and atmosphere connections on said pulsator, a first vacuum and atmosphere conduit connected to one of said vacuum and atmosphere connections and being in communication with said first chamber, a second vacuum and atmosphere conduit in communication with the other vacuum and atmosphere connection and being connected to and in communication with said second chamber, a vacuum source connection on said valve adapted to connect said first and second chambers with a source of vacuum, a movable valve member in said valve, said valve member being movable to a first position to provide for communication between said first and second chambers and the vacuum source connection and to block communication to said pulsator connection, said valve member being movable to a second position to block communication between said chambers and to connect said pulsator connection to the vacuum source connection, and a second valve means movable to block communication between said first and second vacuum and atmosphere conduits and said chambers.

4. In combination, a pipe-line milking system comprising a vacuum line, a pulsator connecting line connected to said vacuum line, a first receiver, means connecting said first receiver to one end of said vacuum line for communication therewith, a second receiver, a milk receiving conduit connected to said receivers for communication therewith, a conduit connection within each receiver, each conduit connection extending adjacent to the bottom of each receiver, pipe means connecting the conduit connections and said receiving conduit, a vacuum conduit communicating with said second receiver, a flushing control unit including a valve having first and second valve chambers, first conduit means connecting said first chamber with said vacuum conduit, second conduit means connecting said second chambers with said vacuum line, a pulsator connection connected to said valve, a pulsator connected to said pulsator connection, alternate vacuum and atmosphere connections on said pulsator, a first vacuum and atmosphere conduit connected to one of said vacuum and atmosphere connections and being in communication with said first chamber, a second vacuum and atmosphere conduit in communication with the other vacuum and atmosphere connection and being connected to and in communication with said second chamber, a vacuum source connection on said valve adapted to connect said first and second chambers with a source of vacuum, and a movable valve member in said valve, said valve member being movable to a first position to provide for communication between said first and second chambers and said vacuum source connection and to block communication to said pulsator connection, said valve member being movable to a second position to block communication between said chambers and to connect said pulsator connection to the vacuum source connection.

5. In combination, a pipe-line milking system comprising a vacuum line, a first receiver, means connecting said first receiver to one end of said vacuum line for communication therewith, a second receiver, a milk receiving conduit connected to said receivers for communication therewith, a conduit connection within each receiver, each conduit connection extending adjacent to the bottom of each receiver, pipe means connecting the conduit connections and said receiving conduit, a vacuum conduit communicating with said second receiver, a flushing control unit including a valve having first and second valve chambers, first conduit means connecting said first chamber with said vacuum conduit, second conduit means connecting said second chamber with said vacuum line, a pulsator connection connected to said valve, a pulsator connected to said pulsator connection, alternate vacuum and atmosphere connections on said pulsator, a first vacuum and atmosphere conduit connected to one of said vacuum and atmosphere connections and being in communication with said first chambers, a second vacuum and atmosphere conduit in communication with the other vacuum and atmosphere connection and being connected to and in communication with said second chambers, a vacuum source connection on said valve adapted to connect said first and second chambers with a source of vacuum, a movable valve member in said second valve, said valve member being movable to a first position to provide for communication between said first and second chambers and said vacuum source connection and to block communication to said pulsator connection, said valve being movable to a second position to block communication between said chambers and to connect said pulsator connection to the vacuum source connection.

6. In a pipe-line milking system comprising a vacuum line, a first receiver connected to said vacuum line, a second receiver, a milk receiving conduit in communication with said first and second receivers, milk inlet means connected to said milk receiving conduit, a vacuum conduit communicating with said second receiver, means for alternately placing said vacuum line and said vacuum conduit under vacuum and atmosphere including a valve, said valve having first and second chambers, said first chamber being connected to said vacuum line, said second chamber being connected to said vacuum conduit, a pulsator connection on said valve, a pulsator connected to said pulsator connection, said pulsator having first and second alternate vacuum and atmosphere connections, first passage means connecting one of said vacuum and atmosphere connections to said first chamber, second passage means connecting the second vacuum and atmosphere connections to the second chamber, a vacuum source connection adapted to communicate with said first and second chambers, a movable valve member in said valve movable to provide communication between said first and second chambers and said vacuum source connection and to close said pulsator connection, said valve member being movable to block communication between said first and second chambers and to open said pulsator connection for communication with the vacuum source connection, and a second valve means between said vacuum and atmosphere connections for blocking communication between said vacuum and atmosphere connections and said chambers.

7. In a pipe-line milking system comprising a vacuum line, a first receiver connected to said vacuum line, a second receiver, a milk receiving conduit in communication with said first and second receivers, milk inlet means connected to said milk receiving conduit, a vacuum conduit communicating with said second receiver, means for alternately placing said vacuum line and said vacuum conduit under vacuum and atmosphere including a valve, said valve having first and second chambers, said first chamber being connected to said vacuum line, said second chamber being connected to said vacuum conduit, a pulsator connection on said valve, a pulsator connected to said pulsator connection, said pulsator having first and second alternate vacuum and atmosphere connections, first passage means connecting one of said vacuum and atmosphere connections to said first chamber, second passage means connecting the second vacuum and atmosphere connections to the second chamber, a vacuum source connection in communication with said first and second chambers, and a movable valve member in said valve movable to provide communication between said first and second chambers and said vacuum source connection and to close said pulsator connection, said valve member being movable to block communication between said first and second chambers and to open said pulsator connection for communication with the vacuum source connection.

8. In a pipe-line milking system comprising a vacuum line, a first receiver connected to said vacuum line, a second receiver, a receiving conduit in communication with said first and second receivers, a source of vacuum connection, an alternating vacuum and air pulsating unit connected to said source of vacuum connection, first conduit means connecting said pulsating unit to said second receiver, second conduit means connecting said pulsating unit to said vacuum line for alternately placing said receivers under vacuum and air whereby a flushing liquid is alternately moved from one receiver to the other through said milk receiving conduit, a valve connected to said pulsating unit, said source of vacuum connection, and said first and second conduit means, said valve including a valve member movable for blocking communication between said pulsating unit and said source of vacuum connection and to provide for communication between said source of vacuum connection and said first and second conduits independently of said pulsating unit whereby both receivers are simultaneously under vacuum and the movement of flushing liquid ceases.

References Cited in the file of this patent

UNITED STATES PATENTS

| 1,393,387 | McCornack | Oct. 11, 1921 |
| 2,595,539 | Redman, Jr. | May 6, 1952 |
| 2,650,179 | Anderson | Aug. 25, 1953 |